(12) United States Patent
Nishihiro et al.

(10) Patent No.: US 10,549,757 B2
(45) Date of Patent: Feb. 4, 2020

(54) VEHICLE CONTROL DEVICE AND VEHICLE CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Yoshimasa Nishihiro, Zama (JP); Masayoshi Nakasaki, Isehara (JP); Naoki Kobayashi, Hadano (JP); Yusuke Oota, Ebina (JP); Shintaro Ohshio, Kanagawa (JP)

(73) Assignees: JATCO Ltd, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/771,563

(22) PCT Filed: Oct. 18, 2016

(86) PCT No.: PCT/JP2016/080858
§ 371 (c)(1),
(2) Date: Apr. 27, 2018

(87) PCT Pub. No.: WO2017/073407
PCT Pub. Date: May 4, 2017

(65) Prior Publication Data
US 2018/0304894 A1    Oct. 25, 2018

(30) Foreign Application Priority Data

Oct. 28, 2015 (JP) .................................. 2015-211499

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/04* (2013.01);
(Continued)

(58) Field of Classification Search
None
See application file for complete search history.

(56) References Cited

U.S. PATENT DOCUMENTS

| 8,696,515 B2* | 4/2014 | Yamada | B60W 10/02 477/127 |
| 2018/0283548 A1* | 10/2018 | Nishihiro | B60W 10/06 |
| 2019/0040947 A1* | 2/2019 | Oota | B60W 10/04 |

FOREIGN PATENT DOCUMENTS

| JP | 2013-213557 A | 10/2013 |
| JP | 2014-231889 A | 12/2014 |

* cited by examiner

*Primary Examiner* — Justin Holmes
(74) *Attorney, Agent, or Firm* — Foley & Lardner LLP (57) ABSTRACT

A vehicle control device for controlling a vehicle includes a drive source and an automatic transmission connected to the drive source and including a variator. The vehicle control device includes: a first control unit configured to execute a during-travel drive source stop control for stopping the drive source and shifting the automatic transmission in a neutral state if a during-travel drive source stop condition is satisfied; and a second control unit configured to execute a during-travel drive source stop release control for shifting the automatic transmission in a power transmission state via a rotation synchronization control in the automatic transmission set in the neutral state if a during-travel drive source stop release condition is satisfied. The second control unit executes the rotation synchronization control with the variator downshifted from a speed ratio during the during-travel drive source stop control if the during-travel drive source (Continued)

stop release condition accompanied by a downshifting request of the variator is satisfied.

3 Claims, 3 Drawing Sheets

(51) Int. Cl.
*B60W 10/04* (2006.01)
*B60W 10/107* (2012.01)

(52) U.S. Cl.
CPC ... *B60W 10/107* (2013.01); *B60W 2030/1809* (2013.01); *B60W 2510/0283* (2013.01); *B60W 2520/10* (2013.01); *B60W 2540/10* (2013.01); *B60W 2540/12* (2013.01); *B60W 2710/028* (2013.01); *B60W 2710/06* (2013.01); *B60W 2710/1005* (2013.01); *B60W 2710/1083* (2013.01)

VEHICLE CONTROL DEVICE AND VEHICLE CONTROL METHOD

TECHNICAL FIELD

The present invention relates to a vehicle control device and a vehicle control method.

BACKGROUND ART

Conventionally, a vehicle control device for executing a during-travel drive source stop control by stopping an engine and releasing a clutch when an accelerator pedal is not depressed is disclosed in JP2013-213557A.

SUMMARY OF INVENTION

However, in JP2013-213557, it is only disclosed to execute the during-travel drive source stop control in a vehicle including a stepped transmission mechanism, but it is not disclosed to execute the during-travel drive source stop control in a vehicle including a continuously variable transmission.

A sailing stop control for stopping an engine and releasing a clutch into a neutral state, for example, if a select lever is in D range, a vehicle speed is a medium or high vehicle speed, an accelerator pedal is not depressed and a brake pedal is not depressed or the like is also known as the during-travel drive source stop control as described above.

For example, the sailing stop control stops the engine with the vehicle speed set at the medium or high vehicle speed. If the vehicle speed is a medium or high vehicle speed, a speed ratio of a continuously variable transmission is on a High side. Further, if the sailing stop control is started to stop the engine, a mechanical oil pump configured to be driven by having power of the engine transmitted thereto is stopped. If the mechanical oil pump is stopped, a hydraulic pressure for changing the speed ratio of the continuously variable transmission becomes insufficient, wherefore the speed ratio of the continuously variable transmission is maintained at the speed ratio when the mechanical oil pump is stopped. As just described, the speed ratio of the continuously variable transmission may be set to the High side at the start of the during-travel drive source stop control.

In releasing the during-travel drive source stop control, downshifting of the continuously variable transmission may be accompanied, such as when the accelerator pedal is depressed. Further, if the clutch is engaged by a rotation synchronization control in releasing the during-travel drive source stop control, a shock at the time of engagement can be reduced. The rotation synchronization control is a control for engaging the clutch when a rotation speed difference between input and output shafts of the clutch becomes smaller than a predetermined value after the engine start.

When downshifting of the continuously variable transmission is accompanied in releasing the during-travel drive source stop control, a driver has an intention to accelerate in many cases. In such cases, if downshifting of the continuously variable transmission is started after the rotation synchronization control is executed to engage the clutch, a time until the completion of downshifting of the continuously variable transmission becomes longer, whereby acceleration performance is reduced and a sense of incongruity may be given to the driver.

The present invention was developed to solve such a problem and aims to suppress a sense of incongruity given to a driver by shortening a time until the completion of downshifting of a continuously variable transmission when a during-travel drive source stop control release condition accompanied by a downshifting request of the continuously variable transmission is satisfied.

According to one aspect of the present invention, a vehicle control device controls a vehicle with a drive source and an automatic transmission connected to the drive source and including a variator. The vehicle control device includes: a first control unit configured to execute a during-travel drive source stop control for stopping the drive source and shifting the automatic transmission in a neutral state if a during-travel drive source stop condition is satisfied; and a second control unit configured to execute a during-travel drive source stop release control for shifting the automatic transmission in a power transmission state via a rotation synchronization control in the automatic transmission set in the neutral state if a during-travel drive source stop release condition is satisfied. The second control unit executes the rotation synchronization control with the variator downshifted from a speed ratio during the during-travel drive source stop control if the during-travel drive source stop release condition accompanied by a downshifting request of the variator is satisfied.

According to another aspect of the present invention, a vehicle control method for controlling a vehicle with a drive source and an automatic transmission connected to the drive source and including a variator, includes: executing a during-travel drive source stop control for stopping the drive source and shifting the automatic transmission in a neutral state if a during-travel drive source stop condition is satisfied; executing a during-travel drive source stop release control for shifting the automatic transmission in a power transmission state via a rotation synchronization control in the automatic transmission set in the neutral state if a during-travel drive source stop release condition is satisfied; and executing the rotation synchronization control with the variator downshifted from a speed ratio during the during-travel drive source stop control if the during-travel drive source stop release condition accompanied by a downshifting request of the variator is satisfied.

In these aspects, if the during-travel drive source stop control release condition accompanied by downshifting of the variator is satisfied, the rotation synchronization control is executed with the variator downshifted from the speed ratio during the during-travel drive source stop control. In this way, a time until the completion of downshifting of the variator can be shortened by downshifting the variator during the rotation synchronization control. Thus, it can be suppressed that a sense of incongruity is given to a driver.

DESCRIPTION OF EMBODIMENT

Hereinafter, an embodiment of the present invention is described with reference to the accompanying drawings. In the following description, a speed ratio is a value obtained by dividing a rotation speed of an input shaft of a continuously variable transmission by a rotation speed of an output shaft of the continuously variable transmission and a case where the speed ratio is large is called Low, whereas a case where the speed ratio is small is called High. Further, a change of the speed ratio to the Low side is called downshifting and a change to the High side is called upshifting.

Figure 1:
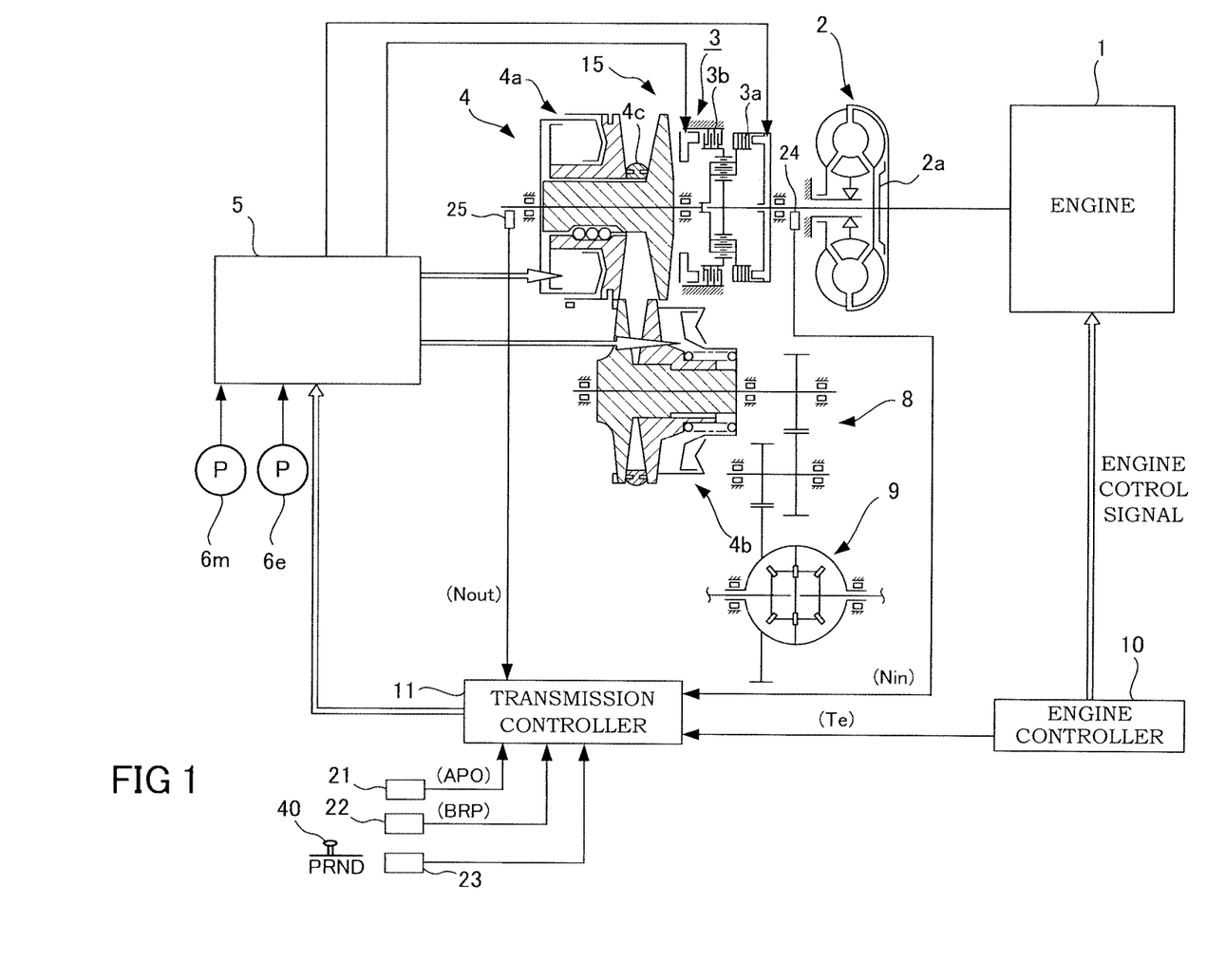
FIG. 1 is a schematic configuration diagram of a vehicle of an embodiment.

FIG. 1 is a schematic configuration diagram of a vehicle of an embodiment. The vehicle includes an engine 1 serving as a drive source, a torque converter 2, a forward/reverse switching mechanism 3, a continuously variable transmission 4 serving as a variator, a hydraulic control circuit 5, a first oil pump 6m, a second oil pump 6e, an engine controller 10 and a transmission controller 11. In the vehicle, rotation generated in the engine 1 is transmitted to unillustrated wheels via the torque converter 2, the forward/reverse switching mechanism 3, the continuously variable transmission 4, a gear set 8 and a differential gear device 9. An automatic transmission 15 is constituted by the forward/reverse switching mechanism 3 and the continuously variable transmission 4.

The torque converter 2 includes a lock-up clutch 2a. When the lock-up clutch 2a is engaged, an input shaft and an output shaft of the torque converter 2 are directly coupled and rotate at the same speed.

The forward/reverse switching mechanism 3 includes a double-pinion planetary gear set as a main constituent element, a sun gear thereof is coupled to the engine 1 via the torque converter 2 and a carrier thereof is coupled to a primary pulley 4a. The forward/reverse switching mechanism 3 further includes a forward clutch 3a for directly coupling the sun gear and the carrier of the double-pinion planetary gear set and a reverse brake 3b for fixing a ring gear, transmits input rotation from the engine 1 via the torque converter 2 as it is to the primary pulley 4a when the forward clutch 3a is engaged and transmits the input rotation from the engine 1 via the torque converter 2 to the primary pulley 4a under reverse deceleration when the reverse brake 3b is engaged.

There are "released", "standby", "slipping" and "engaged" states as states of the forward clutch 3a and the reverse brake 3b. These states are switched according to a hydraulic pressure Pf and a hydraulic pressure Pr supplied to each piston pressure receiving chamber.

The "released" state is, for example, a state where the hydraulic pressure Pf is not supplied to the forward clutch 3a and the forward clutch 3a has no torque capacity.

The "standby" state is, for example, a state where the forward clutch 3a has no torque capacity although the hydraulic pressure Pf is supplied to the forward clutch 3a. In the "standby" state, the forward clutch 3a is in a state immediately before having a torque capacity.

The "slipping" state is, for example, a state where the hydraulic pressure Pf is supplied to the forward clutch 3a, the forward clutch 3a has a torque capacity and a rotation speed difference is generated between an input shaft and an output shaft of the forward clutch 3a. In the "slipping" state, the torque capacity is smaller than an input torque of the forward clutch 3a.

The "engaged" state is, for example, a state where the hydraulic pressure Pf is supplied to the forward clutch 3a, the forward clutch 3a has a torque capacity and no rotation speed difference is generated between the input shaft and the output shaft of the forward clutch 3a. In the "engaged" state, the torque capacity is larger than the input torque of the forward clutch 3a. It should be noted that the "engaged" state includes complete engagement which is reached by further increasing the torque capacity after the torque capacity becomes larger than the input torque of the forward clutch 3a and in which the torque capacity has a margin for the input torque.

The continuously variable transmission 4 includes the primary pulley 4a, a secondary pulley 4b and a belt 4c. In the continuously variable transmission 4, a contact radius between each pulley 4a, 4b and the belt 4c is changed to change the speed ratio by controlling a hydraulic pressure supplied to the primary pulley 4a and a hydraulic pressure supplied to the secondary pulley 4b.

The first oil pump 6m is a mechanical oil pump to which the rotation of the engine 1 is input and which is driven by utilizing part of power of the engine 1. By driving the first oil pump 6m, oil discharged from the first oil pump 6m is supplied to the hydraulic control circuit 5. It should be noted that, when the engine 1 is stopped, the first oil pump 6m is not driven and the oil is not discharged from the first oil pump 6m.

The second oil pump 6e is an electric oil pump which is driven by having power supplied thereto from a battery. By driving the second oil pump 6e when the first oil pump 6m is not driven, the oil can be supplied to the hydraulic control circuit 5 also during an engine stop.

The hydraulic control circuit 5 is composed of a plurality of flow passages, a plurality of hydraulic actuators and the like. The hydraulic actuators are constituted by solenoids or hydraulic control valves. In the hydraulic control circuit 5, the hydraulic actuators are controlled on the basis of a control signal from the transmission controller 11 to switch a hydraulic pressure supply path and a necessary hydraulic pressure is adjusted from a line pressure PL generated by the oil discharged from the first oil pump 6m and the second oil pump 6e. The hydraulic control circuit 5 supplies the adjusted hydraulic pressure to each part of the continuously variable transmission 4, the forward/reverse switching mechanism 3 and the torque converter 2.

The transmission controller 11 is composed of a CPU, a ROM, a RAM and the like. In the transmission controller 11, the CPU reads a program stored in the ROM and executes the program, whereby functions of the transmission controller 11 are exhibited.

A signal from an accelerator pedal opening sensor 21 for detecting an accelerator pedal opening APO, a signal from a brake fluid pressure sensor 22 for detecting a brake fluid pressure BRP corresponding to an operation amount of a brake pedal and a signal from an inhibitor switch 23 for detecting the position of a shift lever 40 are input to the transmission controller 11. Further, a signal from an input-side rotation speed sensor 24 for detecting a rotation speed Nin of an input side (side of the engine 1) of the forward/reverse switching mechanism 3, a signal from an output-side rotation speed sensor 25 for detecting a rotation speed Nout of an output side (side of the continuously variable transmission 4) of the forward/reverse switching mechanism 3, a signal relating to an engine torque Te from an engine controller 10 in charge of a control of the engine 1 and other signals are input to the transmission controller 11.

In the present embodiment, if a sailing stop condition is satisfied during the travel of the vehicle, a sailing stop control is executed to stop fuel injection into the engine 1 and stop the engine 1 and release the forward clutch 3a and the reverse brake 3b into a neutral state in the forward/reverse switching mechanism 3.

In this way, a coasting distance in a state where the engine 1 is stopped becomes longer and fuel consumption of the engine 1 can be improved.

The sailing stop condition includes, for example, the following conditions.

(a) The shift lever 40 is in D range.

(b) A vehicle speed VSP is a first predetermined vehicle speed V1 or higher.

(c) The accelerator pedal is not depressed.

(d) The brake pedal is not depressed.

The first predetermined vehicle speed V1 is a medium or high vehicle speed and set in advance.

The sailing stop condition is satisfied if all the above conditions (a) to (d) are satisfied, and is not satisfied if any one of the above conditions (a) to (d) is not satisfied.

If the sailing stop condition is no longer satisfied during the sailing stop control, the sailing stop control is released, the engine 1 is started and the forward clutch 3a is engaged. That is, the sailing stop condition is also a sailing stop release condition for releasing the sailing stop control. It should be noted that the sailing stop condition and the sailing stop release condition may be different conditions.

If the sailing stop release condition is satisfied, a normal travel control is executed after the engine 1 is started and the forward clutch 3a is engaged. Until the normal travel control is executed after the sailing stop release condition is satisfied, a sailing stop release control (during-travel drive source stop release control) for engaging the forward clutch 3a is executed after the start of the engine 1 and the execution of a rotation synchronization control for synchronizing the input and output rotation speeds of the forward clutch 3. The sailing stop control, the rotation synchronization control, the sailing stop release control and the like are executed by the transmission controller 11 (first control unit and second control unit).

Figure 2:
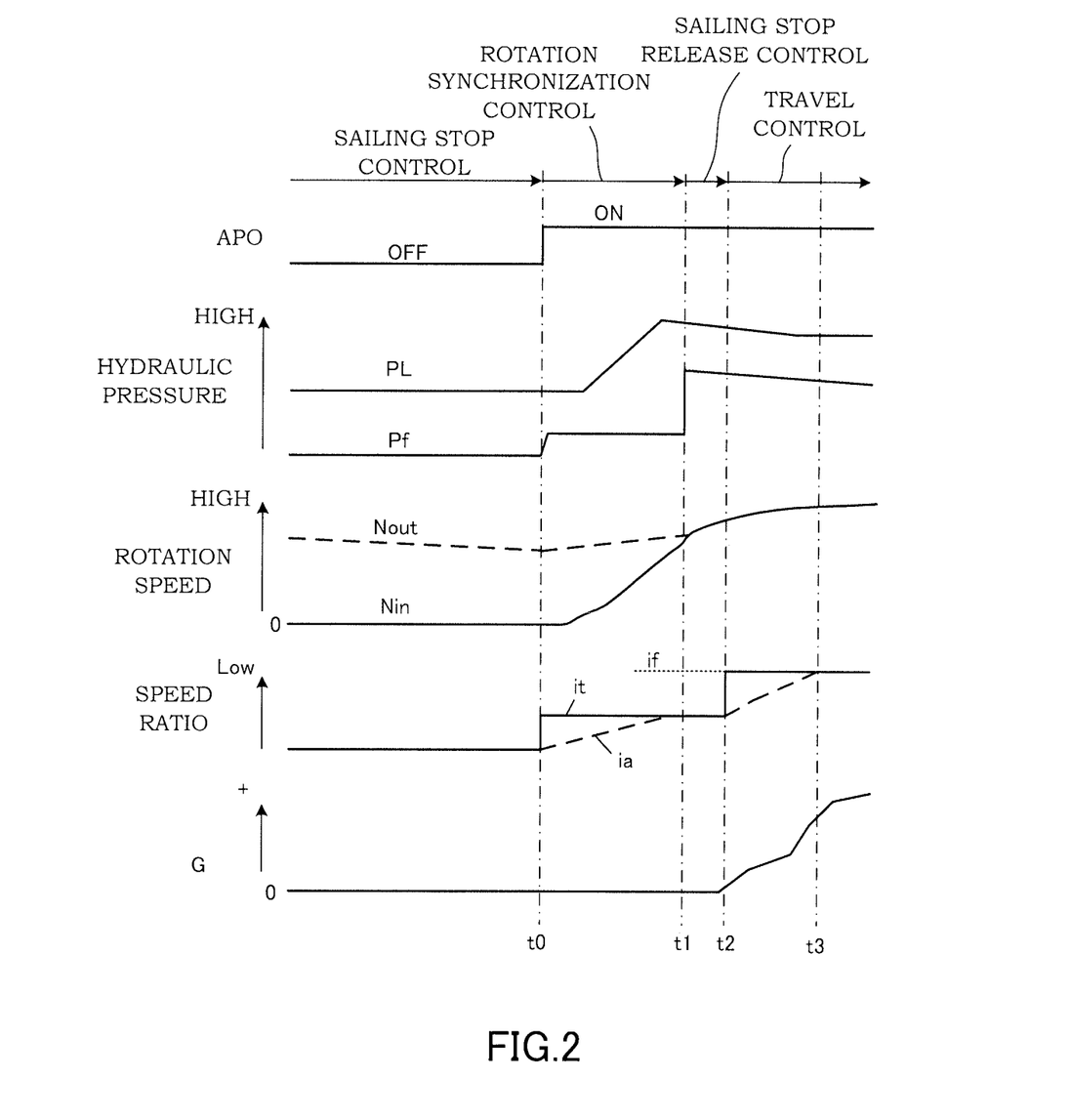
FIG. 2 is a time chart in the case of releasing a sailing stop control in the embodiment.

Next, a case of releasing the sailing stop control is described using a time chart of FIG. 2. FIG. 2 is a time chart in the case of using the present embodiment. Here, it is assumed that the sailing stop control is executed, the engine 1 is stopped and the forward clutch 3a and the reverse brake 3b are released. It should be noted that since the sailing stop control is executed at a medium or high vehicle speed, the speed ratio of the continuously variable transmission 4 is on the High side.

At time t0, the accelerator pedal is depressed and the sailing stop release condition accompanied by downshifting of the continuously variable transmission 4 is satisfied.

A target speed ratio it of the continuously variable transmission 4 is set at a speed ratio on the Lower side than the speed ratio during the sailing stop control and on the Higher side than a final target speed ratio if. The final target speed ratio if is set according to the accelerator pedal opening APO and the vehicle speed VSP. The target speed ratio it of the continuously variable transmission 4 is set at a speed ratio realized by the hydraulic pressure suppliable to the continuously variable transmission 4 when the engine 1 is started. The target speed ratio it may be, for example, set according to the accelerator pedal opening APO and is set on the Lower side as the accelerator pedal opening APO increases.

Further, if the sailing stop release condition is satisfied, the rotation synchronization control is executed. By executing the rotation synchronization control, the engine 1 is started, the first oil pump 6m is driven by the start of the engine 1, the oil is discharged from the first oil pump 6m and the line pressure PL increases. The hydraulic pressure Pf supplied to the forward clutch 3a is controlled to a standby pressure for setting the forward clutch 3a in the standby state. The line pressure PL is generated by the oil discharged from the second oil pump 6e if the oil cannot be sufficiently discharged by the first oil pump 6m.

As just described, if the sailing stop release condition accompanied by downshifting of the continuously variable transmission 4 is satisfied, downshifting is instructed to the continuously variable transmission 4 and the rotation synchronization control is executed with the continuously variable transmission 4 downshifted from the speed ratio during the sailing stop control.

It should be noted that the execution of the rotation synchronization control in a downshifted state does not limit a temporal relationship of the setting of the target speed ratio it to the Lower side than the speed ratio during the sailing stop control after the sailing stop release condition is satisfied, and the instruction to set the forward clutch 3a in the standby state. That is, the target speed ratio it may be set before the instruction to set the forward clutch 3a in the standby state is output after the sailing stop release condition is satisfied or the instruction to set the forward clutch 3a in the standby state may be output before the target speed ratio it is set. Furthermore, these may be simultaneously performed. The execution of the rotation synchronization control in the downshifted state means to include these.

An actual speed ratio is of the continuously variable transmission 4 is changed, following the target speed ratio it by the hydraulic pressure supplied to the continuously variable transmission 4.

The rotation speed Nin on the input side of the forward clutch 3a increases as the engine 1 is started. Further, in the case of downshifting the continuously variable transmission 4, the rotation speed Nin on the input side is set higher than the rotation speed when the continuously variable transmission 4 is not downshifted in order to match the rotation speed Nin on the input side with the rotation speed Nout on the output side of the forward clutch 3a during the rotation synchronization control.

When an absolute value of the rotation speed difference of the input and output rotation speeds of the forward clutch 3a becomes equal to or smaller than a predetermined value at time t1, the sailing stop release control is executed. The predetermined value is a value which is set in advance and at which an engagement shock during engagement is small or no engagement shock is generated and a sense of incongruity is not given to a driver when the forward clutch 3a is engaged. That the absolute value of the rotation speed difference is equal to or smaller than the predetermined value means that the rotation speed Nin on the input side and the rotation speed Nout on the output side of the forward clutch 3a are synchronized. This determination can be made, for example, by calculating a deviation between the rotation speed Nin on the input side and the rotation speed Nout on the output side or a ratio of the rotation speed Nin on the input side and the rotation speed Nout on the output side.

By executing the sailing stop release control, a command hydraulic pressure of the forward clutch 3a increases, the hydraulic pressure Pf supplied to the forward clutch 3a increases and the forward clutch 3a is engaged. The command hydraulic pressure here is a hydraulic pressure at which the forward clutch 3a is completely engaged. It should be noted that an acceleration G of the vehicle is shown in FIG. 2. The vehicle accelerates when the acceleration G is a positive value, whereas the vehicle decelerates when the acceleration G is a negative value. Since the forward clutch 3a is engaged after the absolute value of the rotation speed difference between the input and output rotation speeds of the forward clutch 3a becomes smaller than the predetermined value in the present embodiment, the acceleration G is substantially zero and the generation of an engagement shock is suppressed.

When a predetermined time elapses after the execution of the sailing stop release control to reach time t2, the normal travel control is executed. In this way, the target speed ratio it of the continuously variable transmission 4 is set to the final target speed ratio if and the actual speed ratio is changes, following the target speed ratio it. The predetermined time is a time which is set in advance and during which the forward clutch 3a is reliably engaged. Thus, it can be determined by the elapse of the predetermined time that the forward clutch 3a is in a power transmission state. As just described, in the present embodiment, the continuously variable transmission 4 is downshifted from the speed ratio during the rotation synchronization control when the forward clutch 3a is shifted in the power transmission state. It should be noted that although it is determined that the forward clutch 3a is in the power transmission state after the elapse of the predetermined time following the execution of the sailing stop release control in the present embodiment, the forward clutch 3a may be determined to be in the power transmission state simultaneously with the execution of the sailing stop release control. That is, the continuously variable transmission 4 may be downshifted from the speed ratio during the rotation synchronization control after the rotation synchronization control.

At time t3, the actual speed ratio is reaches the target speed ratio it (final target speed ratio if).

In the present embodiment, if the sailing stop control release condition accompanied by downshifting is satisfied, the continuously variable transmission 4 is once downshifted, the rotation synchronization control is executed and the continuously variable transmission 4 is further downshifted when the forward clutch 3a is shifted in the power transmission state. That is, the continuously variable transmission 4 is downshifted in a stepwise manner when a transition is made from the sailing stop control to the travel control. The continuously variable transmission 4 is not downshifted from the speed ratio during the sailing stop control to the final target speed ratio if at the start of the travel control.

Figure 3:
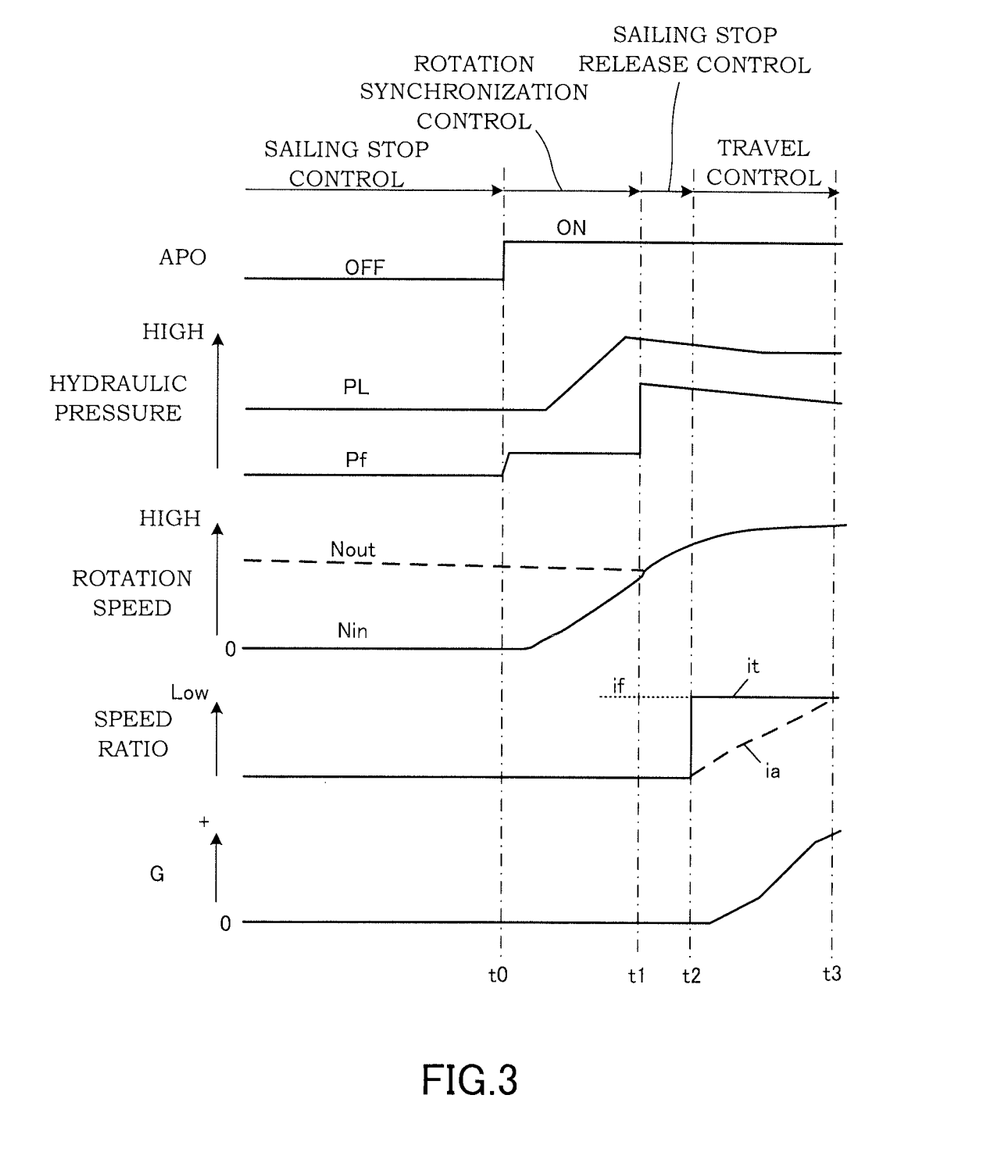
FIG. 3 is a time chart showing a comparative example.

Next, a comparative example not using the present embodiment is described using a time chart of FIG. 3. In the comparative example, the continuously variable transmission 4 is downshifted from the speed ratio during the sailing stop control to the final target speed ratio if at the start of the travel control when a transition is made from the sailing stop control to the travel control.

At time t0, the sailing stop release condition accompanied by downshifting of the continuously variable transmission 4 is satisfied, for example, by the depression of the accelerator pedal.

In the comparative example, the rotation synchronization control is executed without changing the target speed ratio it of the continuously variable transmission 4. Accordingly, during the rotation synchronization control, the target speed ratio it and the actual speed ratio ia are the speed ratio during the sailing stop control. By executing the rotation synchronization control, the engine 1 is started. The hydraulic pressure Pf supplied to the forward clutch 3a is controlled to a standby pressure at which the forward clutch 3a is shifted in the standby state.

At time t1, when the absolute value of the rotation speed difference between the input and output rotation speeds of the forward clutch 3a becomes smaller than the predetermined value, the sailing stop release control is executed.

When a predetermined time elapses after the execution of the sailing stop release control to reach time t2, the normal travel control is executed. In the comparative example, when the travel control is started, the target speed ratio it of the continuously variable transmission 4 is set to the final target speed ratio if and the continuously variable transmission 4 is downshifted. The actual speed ratio ia of the continuously variable transmission 4 changes, following the target speed ratio it, due to the hydraulic pressure supplied to the continuously variable transmission 4.

At time t3, the actual speed ratio ia reaches the target speed ratio it (final target speed ratio if).

Since downshifting of the continuously variable transmission 4 is started after the start of the normal travel control in the comparative example, a time until the actual speed ratio ia reaches the target speed ratio it (final target speed ratio if) becomes longer. That is, a time until downshifting is completed after the sailing stop release condition is satisfied becomes longer.

Functions of the embodiment of the present embodiment are described.

If the sailing stop release condition accompanied by downshifting is satisfied such as by the depression of the accelerator pedal, the driver has an intention to accelerate and acceleration by quick downshifting may be required. However, in the comparative example described above, the time until the completion of downshifting becomes longer and a sense of incongruity is given to the driver.

In the present embodiment, if the sailing stop release condition accompanied by downshifting of the continuously variable transmission 4 is satisfied such as by the depression of the accelerator pedal during the sailing stop control, the rotation synchronization control is executed with the continuously variable transmission 4 downshifted from the speed ratio during the sailing stop control. In this way, a time until the completion of downshifting after the engagement of the forward clutch 3a via the rotation synchronization control can be shortened. In this way, it can be suppressed that a sense of incongruity is given to the driver.

It can be also thought to downshift the continuously variable transmission 4 to the final target speed ratio if during the rotation synchronization control to shorten the time until the completion of downshifting. However, if the continuously variable transmission 4 is downshifted during the rotation synchronization control and the amount of downshifting (change amount of the speed ratio toward the Low side) increases, a time required for the rotation synchronization control becomes longer.

In the present embodiment, the target speed ratio it is set to the final target speed ratio if when the forward clutch 3a is shifted in the power transmission state without downshifting the continuously variable transmission 4 to the final target speed ratio if during the rotation synchronization control. By downshifting the continuously variable transmission 4 from the speed ratio during the rotation synchronization control after the rotation synchronization control in this way, it can be suppressed that the time of the rotation synchronization control becomes longer.

The embodiment of the present invention is described above. However, the above embodiment does not intend to limit the technical scope of the present invention to the specific configurations of the above embodiment but only indicates part of application examples of the present invention.

Although the automatic transmission 15 including the forward/reverse switching mechanism 3 has been described in the above embodiment, the invention may be applied to an automatic transmission 15 including a sub-transmission mechanism. Further, the automatic transmission 15 may be configured to include a stepped transmission or a toroidal type continuously variable transmission other than the continuously variable transmission 4.

Further, the sailing stop control has been described as an example of the during-travel drive source stop control in the above embodiment. However, the during-travel drive source stop control may be, for example, a coast stop control. That is, the above control can be applied when a during-travel drive source stop release condition accompanied by down-shifting of the continuously variable transmission 4 is satisfied, the engine 1 serving as the drive source is started and the forward clutch 3a is engaged after a during-travel drive source stop condition is satisfied and the engine 1 is stopped and the forward/reverse switching mechanism 3 is shifted in the neutral state during travel.

The coast stop control is executed by the transmission controller 11 if a coast stop establishing condition is satisfied. The coast stop establishing condition includes, for example, the following conditions (a) to (d). (a) The shift lever 40 is in D range. (b) The vehicle speed VSP is below a predetermined vehicle speed. (c) The accelerator pedal is not depressed. (d) The brake pedal is depressed. The predetermined vehicle speed is a low vehicle speed equal to or lower than a vehicle speed at which the lock-up clutch 2a is released.

The coast stop establishing condition is satisfied if all the conditions (a) to (d) are satisfied and is not satisfied if any one of the conditions (a) to (d) is not satisfied. Further, a coast stop release condition is, for example, that any one of the conditions (a) to (d) is no longer satisfied during the coast stop control. The coast stop establishing condition and the coast stop release condition may be different conditions.

In the above embodiment, a case has been described where the engine 1 is the drive source. However, the drive source may be, for example, a motor or the engine 1 and a motor.

In the above embodiment, a single controller may be composed of the transmission controller 11 and the engine controller 10. Further, the transmission controller 11 may be composed of a plurality of controllers.

In the above embodiment, the continuously variable transmission 4 is downshifted from the speed ratio during the rotation synchronization control when the forward clutch 3a is shifted in the power transmission state. However, without limitation to this, the continuously variable transmission 4 is downshifted from the speed ratio during the rotation synchronization control after the forward clutch 3a is shifted in the power transmission state. Effects similar to those of the above embodiment can be obtained also by this.

Further, although the target speed ratio it of the continuously variable transmission 4 is changed in two steps after the sailing stop release condition is satisfied in the above embodiment, there is no limitation to this and the target speed ratio it may be changed in three or more steps. Further, the target speed ratio it may be continuously changed during the rotation synchronization control. For example, the target speed ratio it may be changed at a predetermined gradient with a constant change rate and the change rate may be a variable. If the change rate is the variable, the target speed ratio it changes along a curve.

Further, a return spring may be provided in the secondary pulley 4b of the continuously variable transmission 4. By providing the return spring, if the supply of the hydraulic pressure to the secondary pulley 4b is stopped, a movable pulley of the secondary pulley 4b moves toward a fixed pulley by a biasing force of the return spring and the speed ratio of the continuously variable transmission 4 is changed toward the Low side. In this way, the speed ratio of the continuously variable transmission 4 changes toward the Low side and the occurrence of belt slippage in the continuously variable transmission 4 can be prevented when the vehicle is towed.

If a pressure receiving area of the primary pulley 4a and that of the secondary pulley 4b are made equal in the continuously variable transmission 4 provided with the return spring, the speed ratio of the continuously variable transmission 4 cannot be set to Highest. Thus, when the return spring is provided, a total pressure receiving area of the primary pulley 4a is made larger than that of the secondary pulley 4b. In such a continuously variable transmission 4, a thrust force generated by the return spring, the total pressure receiving area of the primary pulley 4a and the total pressure receiving area of the secondary pulley 4b may be set such that the speed ratio of the continuously variable transmission 4 can be maintained when the hydraulic pressures supplied to the primary pulley 4a and the secondary pulley 4b are equal. In such a continuously variable transmission 4, if the engine 1 is stopped, for example, by the sailing stop control, the oil is no longer discharged from the first oil pump 6m and the hydraulic pressure is no longer supplied to the continuously variable transmission 4, the speed ratio of the continuously variable transmission 4 is shifted to the Low side. Thus, the speed ratio is desirably maintained by supplying the hydraulic pressure to the continuously variable transmission 4 using the second oil pump 6e and making the hydraulic pressures supplied to the primary pulley 4a and the secondary pulley 4b equal.

This application claims priority based on Japanese Patent Application No. 2015-211499 filed with the Japan Patent Office on Oct. 28, 2015, the entire contents of which are incorporated into this specification.

The invention claimed is:

1. A vehicle control device for controlling a vehicle with a drive source and an automatic transmission connected to the drive source and including a variator, comprising:
   a first control unit configured to execute a during-travel drive source stop control for stopping the drive source and shifting the automatic transmission in a neutral state when a during-travel drive source stop condition is satisfied; and
   a second control unit configured to execute a during-travel drive source stop release control for shifting the automatic transmission in a power transmission state via a rotation synchronization control in the automatic transmission set in the neutral state when a during travel drive source stop release condition is satisfied, wherein
   the second control unit is configured to execute the rotation synchronization control with the variator downshifted from a speed ratio during the during-travel drive source stop control when the during-travel drive source stop release condition accompanied by a downshifting request of the variator is satisfied, and
   the second control unit is configured to downshift the variator from a target speed ratio during the rotation synchronization control, after the rotation synchronization control.

2. A vehicle control method for controlling a vehicle with a drive source and an automatic transmission connected to the drive source and including a variator, comprising:
   executing a during-travel drive source stop control for stopping the drive source and shifting the automatic transmission in a neutral state when a during-travel drive source stop condition is satisfied;
   executing a during-travel drive source stop release control for shifting the automatic transmission in a power transmission state via a rotation synchronization control in the automatic transmission set in the neutral state when a during-travel drive source stop release condition is satisfied;

executing the rotation synchronization control with the variator downshifted from a speed ratio during the during-travel drive source stop control when the during-travel drive source stop release condition accompanied by a downshifting request of the variator is satisfied; and downshifting the variator from a target speed ratio during the rotation synchronization control, after the rotation synchronization control.

3. A vehicle control device for controlling a vehicle with a drive source and an automatic transmission connected to the drive source and including a variator, comprising:

first control means for executing a during-travel drive source stop control for stopping the drive source and shifting the automatic transmission in a neutral state when a during-travel drive source stop condition is satisfied; and second control means for executing a during-travel drive source stop release control for shifting the automatic transmission in a power transmission state via a rotation synchronization control in the automatic transmission set in the neutral state when a during-travel drive source stop release condition is satisfied, wherein the second control means executes the rotation synchronization control with the variator downshifted from a speed ratio during the during-travel drive source stop control when the during-travel drive source stop release condition accompanied by a downshifting request of the variator is satisfied, and the second control unit downshifts the variator from a target speed ratio during the rotation synchronization control, after the rotation synchronization control.

* * * * *